Oct. 24, 1950     P. G. T. GEYER     2,527,185
METHOD OF AND MEANS FOR FILLING LIGHTING
TUBES WITH RARE GAS

Filed May 4, 1948     6 Sheets-Sheet 1

Inventor
Paul G. T. Geyer
By
Rockwell, Bartholow
Attorneys

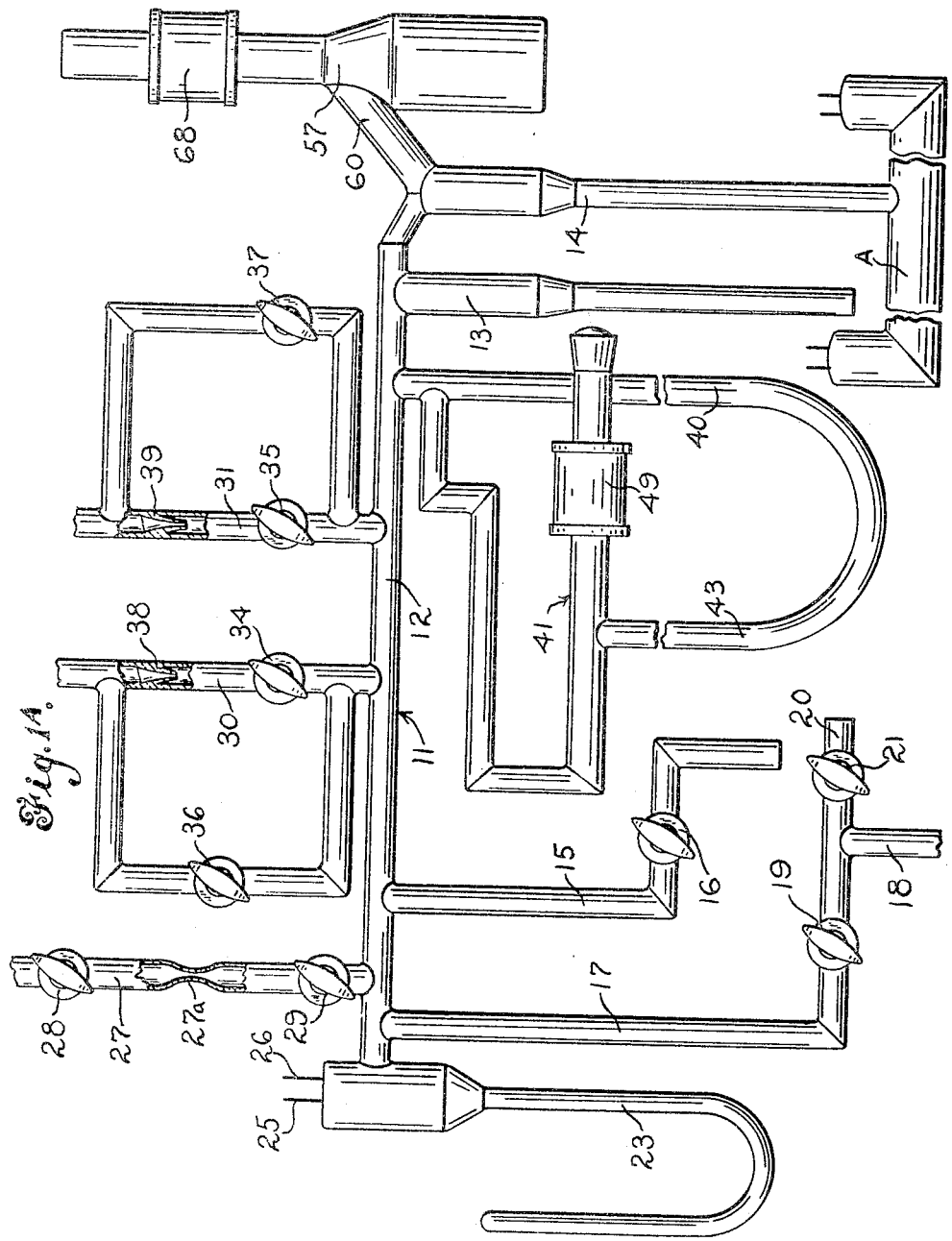

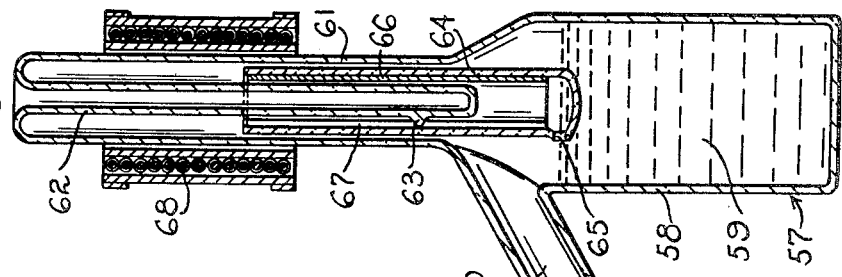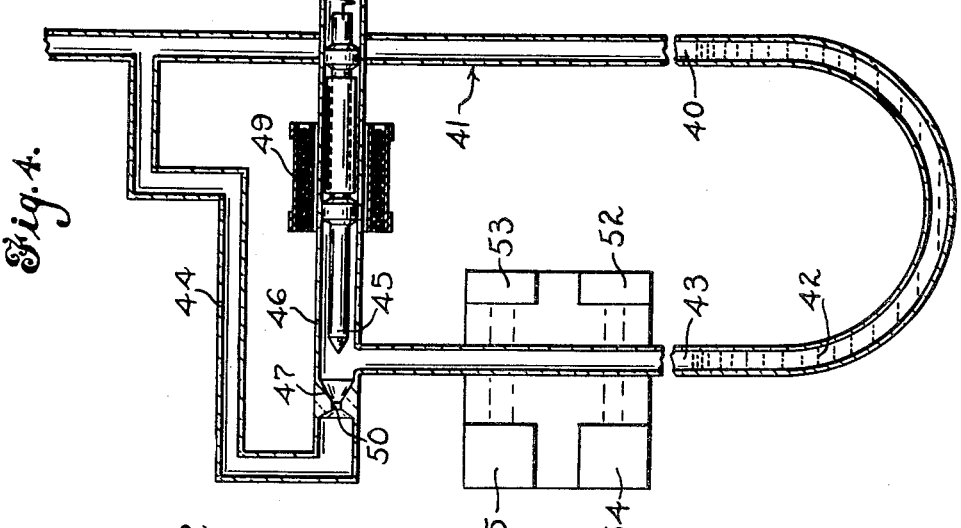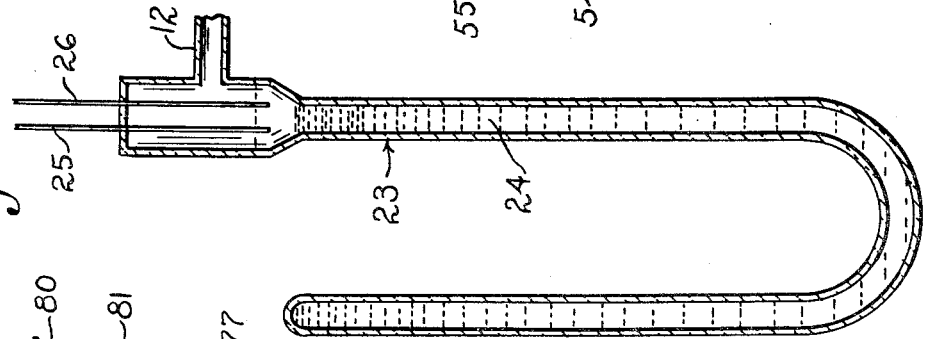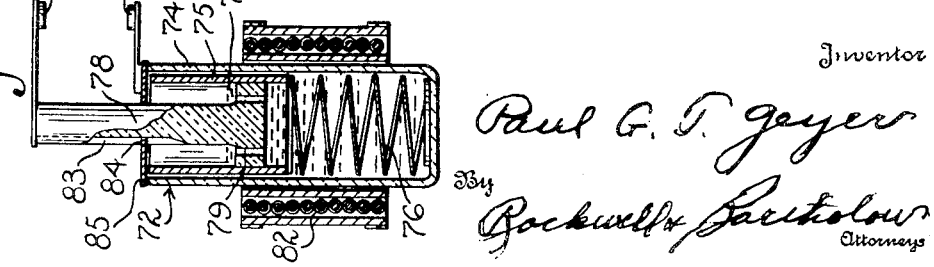

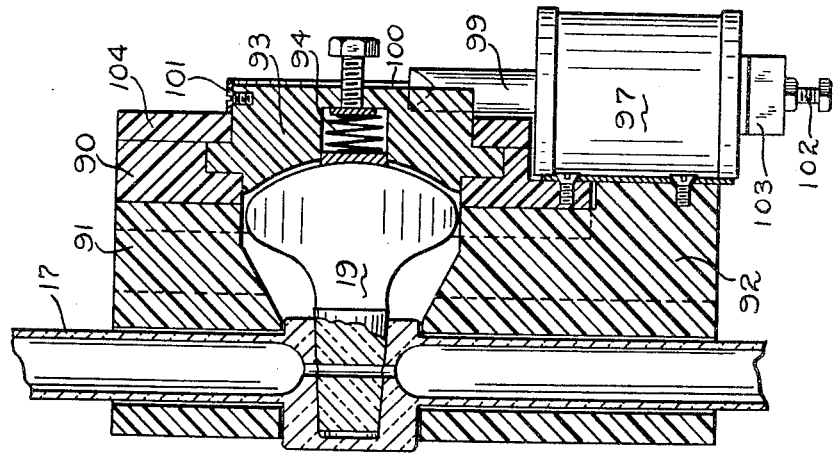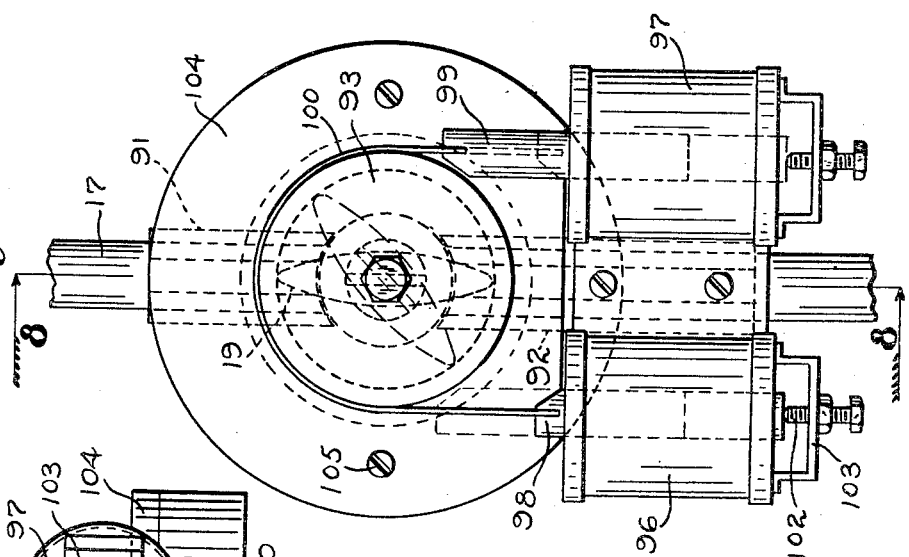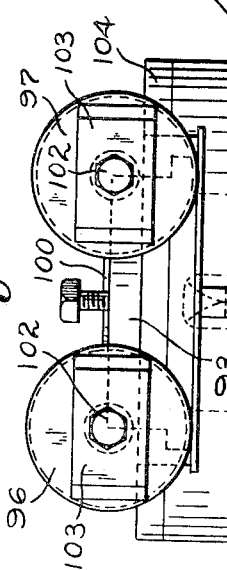

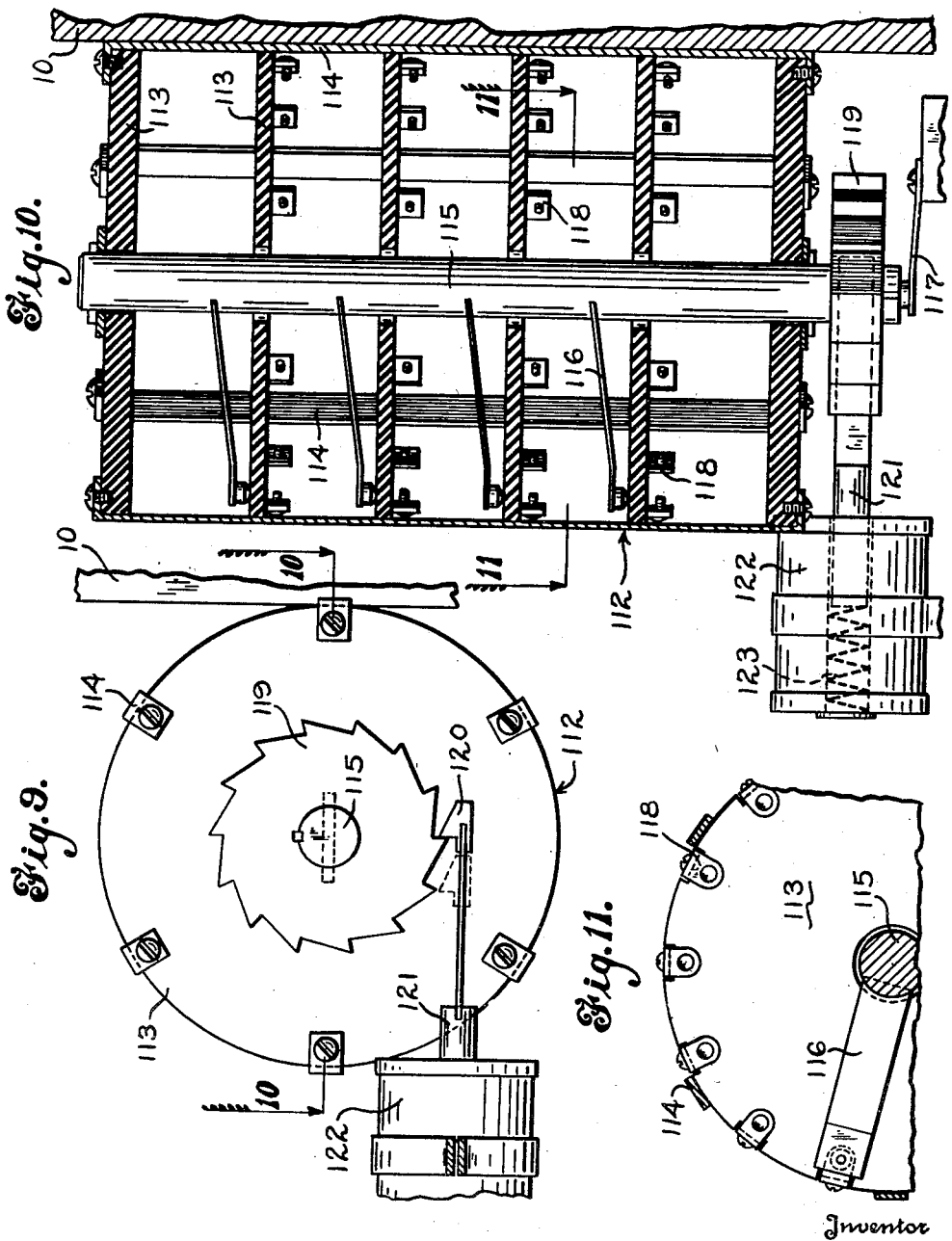

Oct. 24, 1950

P. G. T. GEYER 2,527,185

METHOD OF AND MEANS FOR FILLING LIGHTING TUBES WITH RARE GAS

Filed May 4, 1948

Inventor
Paul G. T. Geyer
By Rockwell & Bartholow
Attorneys

Patented Oct. 24, 1950

2,527,185

UNITED STATES PATENT OFFICE 2,527,185

METHOD OF AND MEANS FOR FILLING LIGHTING TUBES WITH RARE GAS

Paul G. T. Geyer, Guilford, Conn., assignor, by direct and mesne assignments, of one-half to George R. Willis, New Haven, Conn., and one-half to Paul G. T. Geyer, Guilford, Conn.

Application May 4, 1948, Serial No. 25,034

23 Claims. (Cl. 316—26)

This invention relates to methods of and means for filling with a rare gas such tubes as neon or cold cathode tubes, for example, but is applicable to the filling of any tube with a gas where the air is first evacuated from the tube prior to the introduction into the tube of the gas with which it is to be filled.

In the filling of such tubes as cold cathode tubes, for example, it is necessary to first exhaust the air from the tube by means of a pump, for example, and then the tube is bombarded by connecting the electrodes to an electric circuit in order to rid the tube of occluded air and to completely dry it. It is not desired to have the bombardment begin until the tube has been exhausted to a certain degree of vacuum, and it is also desired that the bombardment be discontinued when the electrodes reach a certain temperature. After the tube has been dried and the occluded air expelled therefrom, it is usually flushed out with a flushing gas, and, at this time, it is necessary to discontinue the exhaust pump from the tube during the introduction of the flushing gas thereto.

Thereafter, the tube is re-connected with the exhaust pump and the flushing gas exhausted from the tube. The tube is then allowed to cool, and the rare gas with which the tube is to be filled is introduced thereinto under a small amount of pressure. When sufficient gas has been introduced into the tube, it is cut off and the operation may now be complete.

However, in some instances, it is desirable to inject a small amount of mercury into the tube, and the present invention also provides for this operation.

The above operations have usually been carried out by hand in that they have required the interposition of the operator or attendant for determining, for example, when to start the bombarding operation, when it should be discontinued, when the tube is ready for the introduction of the rare gas, and, in fact, when each and every one of the steps in the process of evacuating and filling the tube should be performed.

I contemplate by the present invention the provision of an apparatus for performing all of the necessary and desirable steps in the filling of a tube with rare gas without any attention on the part of the operator, the various operations being started and discontinued automatically once the device is set into operation. In other words, it is only necessary for the operator to connect the tube to the manifold of the apparatus to be described below, and, by pressing a starter button or actuating a switch, set the device into operation, and the various process steps will be carried out in the desired sequence and at the necessary time intervals until a signal is given to notify the attendant that the operation has been completed. At this time, the tube may be removed from the apparatus.

Substantially the same process, so far as the basic steps are concerned, is carried out when a neon tube is filled with neon gas. There are, however, certain additional operations required in the filling of a cold cathode tube that are not required in the filling of a neon tube. The apparatus illustrated herein will perform all of the necessary steps for the filling of a cold cathode tube, and, if it is desired to fill a neon tube, it is only necessary to omit certain of these steps, and the same apparatus may be used with such omissions for filling the neon tube.

One object of the present invention is to provide an apparatus for filling lighting tubes with rare gas.

A further object of the invention is to provide an apparatus for filling lighting tubes with rare gas so arranged that the filling operation will take place automatically once the tube to be filled is connected thereto with little or no attention on the part of the operator.

A still further object of the invention is to provide a novel and improved method of filling lighting tubes with rare gas.

A still further object of the invention is to provide a new and improved apparatus for filling lighting tubes with rare gas, which apparatus is designed to have a tube connected thereto, and, when once set into operation, effect all of the necessary steps required to fill the tube with the desired gas without further attention on the part of the operator.

Still another object of the invention is to provide an apparatus of the character described above, which will automatically provide the necessary and desired time intervals between the various operations, and which will start and stop such operations at the proper time or times, and, at the same time, carry such operations through to completion without attention on the part of the operator.

To these and other ends the invention consists in the novel features and combinations of parts to be hereinafter described and claimed.

In the accompanying drawings:

Fig. 1A is a more or less diagrammatic view of the manifold or tubing arrangement employed in my apparatus and method;

Fig. 2 is a sectional view of the lag device;

Fig. 3 is a sectional view of a manometer employed with the apparatus;

Fig. 4 is a sectional view of the device employed for discontinuing the charging operation at the proper time;

Fig. 5 is a sectional view of the mercury injector for injecting mercury into the lighting tube when this is desired;

Fig. 6 is a sectional view on line 6—6 of Fig. 1 looking in the direction of the arrows and showing the valve-operating mechanism;

Fig. 7 is a front elevational view of this mechanism;

Fig. 8 is a sectional view on line 8—8 of Fig. 7;

Fig. 9 is a bottom plan view of the master switch mechanism for controlling the apparatus;

Fig. 10 is a sectional view on line 10—10 of Fig. 9;

Fig. 11 is a fragmentary sectional view on line 11—11 of Fig. 10; and

Figure 1:
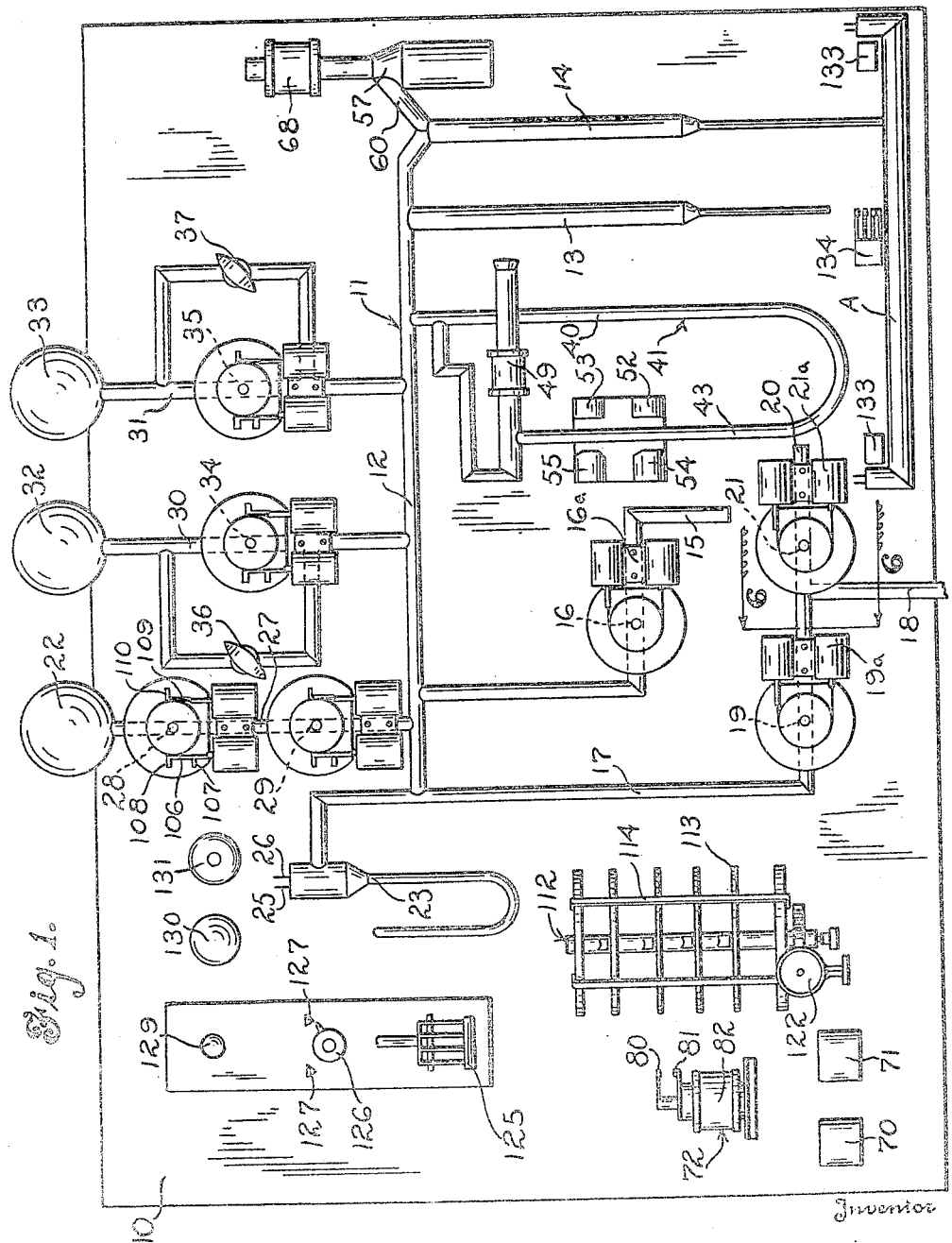
Fig. 1 is an elevational view of an apparatus embodying my improvements.

To illustrate a preferred embodiment of my invention and a preferred method of carrying out my improved process, I have shown in Fig. 1 of the drawings an apparatus comprising a supporting panel 10 on which is mounted a manifold or system of tubing designated generally by the numeral 11. This manifold comprises a main tubular conduit 12 to which are connected the tubes 13 and 14, which tubes are designed to be connected to the lighting tube to be filled, this latter tube being designated by the letter A, and shown more particularly on Figs. 1 and 1A. As shown on these figures, the lighting tube A is connected to the tube 14, but it may be connected alternatively to the tube 13, depending upon whether or not it is desired to inject mercury in the light tube, as will be explained hereinafter.

Connected to the tube 12 is a blower tube 15 through which the operator may blow air to connect the tube 14 to the tube A when the latter is connected to the apparatus for the filling operation. The tube 15 is controlled by an oscillating valve 16, shown more particularly in Fig. 1A, so that this tube may be cut off from communication with the atmosphere when necessary.

Also connected to the tube 12 is the exhaust tube 17 connected to an exhaust pump (not shown) by the tube 18, the communication of the tube 17 with the pump being controlled by the valve 19. The pump may be vented through the tube 20, this vent opening also being controlled by a valve 21.

At one end, the tube 12 is in communication with a manometer 23, this manometer being shown in section in Fig. 3. It is filled with a liquid, preferably mercury 24, and at one end contains a pair of conducting wires 25 and 26, the lower ends of which normally stand above the mercury level in such a position that when the level rises it will close a circuit between the wires 25 and 26 and result in certain operations which will be hereinafter described, the rise of the mercury in the right-hand leg of the manometer 23 being caused by the presence of vacuum, or partial vacuum, in the tube 12.

Also connected to the tube 12 is a tube 27 having a constriction 27ª therein, and also being provided with a valve 28 above this constriction and a valve 29 below the constriction. This tube, as will be hereinafter explained, is designed for connection with a supply of flushing gas, and, as will also be explained, the valves 28 and 29 will be automatically operated at the proper time to throw a charge of flushing gas into the tube A and thereafter close the communication between the tube 12 and the tube 27, so as to cut off the tube A from the supply of flushing gas. The tube 27 is connected to a container 22.

The rare gas with which the tube A is to be filled is introduced thereinto through the rectangular tubular constructions 30 or 31, depending upon what gas is to be used, both of these devices being connected to the tube 12, and it will be understood that they are of similar or identical construction, and will be used alternatively, one being provided with a connection to a supply of one kind of gas, and the other being connected to a supply of a different gas. As shown in Fig. 1, the tube 30 is connected at its upper end with a supply container 32, and the tube 31 similarly connected with a supply 33. The introduction of the rare gas into the tube 12 is controlled by valves 34 and 35, respectively, these valves being automatically actuated to opened and closed positions, as will be hereinafter explained.

In these rectangular tubular constructions are also manually-operated valves 36 and 37, the purpose of which will be explained hereinafter, and the tubes 30 and 31 are provided with constrictions 38 and 39, respectively, to slow down to some extent the flow of gas into the tube 12 from the containers 32 and 33.

Also connected to the tubular member 12 is one of the legs 40 of a manometer 41, which manometer may contain a quantity of liquid, such as mercury or dibutyl phthalate 42. The other leg 43 of the manometer is not closed, but is connected with the first leg 40 by the duct 44, and the communication between the members 43 and 44 is controlled by a valve 45 slidably mounted in a tubular member 46, this valve cooperating with the valve seat 47. A tension spring 48 secured to the valve normally holds it to the right, as shown in Fig. 4, which is its open position, and, in this position, both legs of the manometer tube are subject to the same pressure, so that the liquid 42 will stand at the same level in both legs 40 and 43.

Surrounding the member 46 is a solenoid 49, which, when energized, serves to draw the valve 45 to the left and close the port 50 in the valve seat 47. When this port is closed, the leg 40 of the manometer will be subject to the degree of pressure existing in tube 12, and, if this pressure is higher than that existing in the leg 43, the liquid 42 will be caused to rise in the latter leg.

One or more electric eyes are designed to be affected by the liquid 42 when it rises in the leg 43 of the manometer 41. As shown in Fig. 4, light sources 52 and 53 are arranged at one side of the tube and photo-sensitive cells 54 and 55 at the other side. When the liquid 42 rises sufficiently high in the leg 43 of the manometer to cut off either of these light sources from the photo-sensitive cell (depending upon which light source may then be active by being connected with an electric circuit), an electric circuit will be made in the usual manner and will perform certain operations, as will be hereinafter explained.

In the filling of some tubes, such as cold cathode tubes, it is desirable to inject a small amount of mercury into the tube. For this purpose, there is provided and connected to the tube 14 a mercury injector, designated by the numeral 57 and shown in detailed sectional view in Fig. 5. This injector comprises a container 58 for the mercury 59, and a tubular connection 60 connecting this container, above the level of the mercury therein, to the tube 14. The container 58 is provided with a neck 61, this neck having a returned portion 62 of reduced diameter extending downwardly therein and provided with a projecting guide lug 63.

Within the neck 61 is a plunger 64 having a small opening 65 at its lower end, and, within this plunger and secured thereto, is a metal cylindrical member 66 provided with a longitudinal slot 67 within which the guide lug 63 is received. As this lug rides in the slot 67 during the up-and-down movements of the plunger 64, it serves to prevent rotation of the plunger on the portion 62 of the neck 61, thus maintaining the opening 65 in the position shown, opposite the tube 60.

The plunger 64 may be raised by means of the solenoid 68 mounted exteriorly of the neck 61, and the plunger will drop by its own weight when this solenoid is de-energized. It is seen, therefore, that, when the plunger is in its lower position shown in Fig. 5, a small amount of mercury will enter the plunger through the opening 65. When the plunger is raised by the energization of the solenoid 68, the return port 62 of the neck 61 will act as a plunger, and will cause a small charge of mercury in the plunger 64 to be expelled from the plunger through the opening 65 into the tube 60 and thence through the tube 14 into the lighting tube A which is to be filled.

It is desirable to defer some of the steps in the process for a short time in order that certain antecedent operations be performed and that each of the steps of the process will be effected at the proper time, and it is also necessary that certain of the operations be timed so that they will be discontinued at the end of a given time interval. For the latter function, I have provided the timers 70 and 71, shown at the lower left-hand corner of Fig. 1 of the drawings, and the specific function of these timers will be hereinafter explained.

To defer one of the steps of the process for a short time, I have provided a lag device designated generally by the numeral 72 and shown on Fig. 1 of the drawings adjacent the timers 70 and 71. All of these devices are mounted upon the panel 10 and suitably connected with the master controlling switch for the apparatus, as will be explained hereinafter.

The details of this lag device are shown in the sectional view of Fig. 2 of the drawings. It comprises a cylindrical container 74 within which is movably mounted a cylindrical metal piston 75, the latter being urged upwardly by the spring 76. Within the container is a suitable amount of liquid, such as oil 77, and secured within the piston 75 is a glass stem 78 having ports 79 through the lower portion thereof to permit the passage of the liquid 77 therethrough during movements of the piston. The stem 78 is provided with an electrical contact member 80 designed to make contact with a cooperating contact member 81 attached to the cylinder 74. Surrounding the latter cylinder is a solenoid 82, which, when activated, tends to move the cylinder 75 in one direction or downwardly, as shown in this figure.

When the solenoid is activated and draws the cylinder 75 downwardly, this action will be retarded or checked by the liquid 77 for, as the piston fits fairly closely within the cylinder, the oil displaced by the downward movement of the piston must flow upwardly through the small openings 79. Therefore, the piston travels slowly and the contacts 80 and 81 do not become engaged immediately that the solenoid 82 is activated, thus effecting a time lag between the energization of the solenoid and the making of contact between the contacts 80 and 81.

When the solenoid is de-energized, the spring 76 tends to separate the contacts 80 and 81 and return the piston 75 to its upper position. The stem 78 is provided with a longitudinal groove 83 within which operates a tongue or a lip 84 projecting from the cover 85 of the cylinder 74 in order to prevent rotation of the piston and maintain the contacts 80 and 81 in proper alignment for engagement, when one is moved toward the other.

As stated above, the valves 36 and 37 are manually operated, but the remaining valves 16, 19, 21, 28, 29, 34 and 35 are designed to be electrically operated, and I have shown in Fig. 1 of the drawings solenoids to effect the operation of these valves. As these solenoids are substantially alike, it will be necessary to describe only those in connection with one of the valves, which, for example, is shown more particularly in Figs. 6, 7 and 8.

Mounted upon the tube adjacent the valve 19, for example, is a circular supporting member 90, which may be secured in place by members 91 and 92 having openings therein so that they are slipped upon the tube and thereafter secured to the member 90. Rotatably mounted in the latter member is a block 93 non-rotatably connected to the valve 19, so that, when the block 93 is rotated in the supporting member 90, the valve 19 will also be rotated to open or close communication through the tube controlled by the valve 19. The valve 19 may be maintained in place under pressure of a spring 94 mounted in a recess in the block 93 and bearing against the outer portion of the valve.

Secured to the member 92 are solenoids 96 and 97 provided, respectively, with plungers 98 and 99. To these plungers are connected the ends of a strap or harness 100 which passes over the top of the circular block 93, and is secured to this block by the screw 101.

It will be understood that the solenoids 96 and 97 will be energized alternatively, and, when energized, will pull the corresponding plungers downwardly as shown in Figs. 7 and 8. This will serve to rotate the block 93, and, therefore, the valve 19, thus opening or closing the valve depending upon which of the solenoids is energized. As shown in full lines in Fig. 7, the solenoid 96 has been energized, and, therefore, the plunger 98 has been pulled down, thus placing the valve 19 in the vertical or open position shown in Figs. 7 and 8. When the solenoid 96 is de-energized and the solenoid 97 is energized, the plunger 99 will be pulled downwardly, thus moving the valve through a slight angle, as shown in dotted lines in Fig. 7, thus closing the valve, and, therefore, closing communication through the pipe which the valve controls. The downward movement of the plungers 98 and 99 may be limited by stop screws 102 adjustably mounted in brackets 103 secured at the lower ends of the solenoids.

The block 93 is held in place by a circular plate 104, this plate being secured to the member 90 by the screws 105. This construction permits the plate 104 to be removed, thus permitting removal of the block 93 and the valve 19 when it is necessary to oil or remove the latter.

Certain of these valve-actuating solenoids, as shown in Fig. 1, are provided with means to reverse the current at the end of the movement of the plunger in one direction. For this purpose, secured to the plunger 98 is an upwardly extending arm 106 provided with upper and lower laterally projecting fingers 107 and 108, which fingers are designed to engage certain electrical contacts as will be hereinafter explained, and the plunger 99 of the cooperating solenoid 97 may be provided with an upwardly extending arm 109 having a finger 110 for the same purpose.

Also secured to the panel 10 is a master control switch mechanism designated generally by the numeral 112, which mechanism is shown in greater detail in Figs. 9 to 11 of the drawings. This mechanism comprises a frame, which frame is composed of a plurality of disks 113 of insulating material, the disks being connected together by spaced bars 114. Rotatably mounted in the upper and lower disks, and passing freely through the remainder of the disks, is a shaft 115 carrying a plurality of contact arms 116, four in number as shown in the drawings. It will be understood that the shaft 115 is of conducting material and at its lower end engages a contact member 117.

As previously stated, each of the intermediate disks 113 is of insulating material, and is provided with a plurality of contacts 118 designed to be engaged by the end of the contact arm 116 as the shaft 115 is rotated, so that, when the arm 116 engages one of these contacts, it will connect a conducting wire secured to such contact with the contact 117 to close a circuit through these members.

At the lower end of the shaft 115 is secured a ratchet wheel 119, the teeth of which are adapted to be engaged by a pawl 120 secured to the plunger 121 of a solenoid 122, which solenoid may be secured adjacent the frame of the switch member in any suitable manner. The plunger 121 is urged in one direction, or toward the right, as shown in Fig. 10, by the spring 123, and is drawn in the opposite direction by the solenoid 122 when the latter is energized. It will be seen, therefore, that, when this solenoid 122 is energized, the ratchet wheel 119 will be moved through the distance between two adjacent teeth, or through one step, and will remain in such position until the pawl 120 has been returned to its original position by the spring 123 and the solenoid is again energized.

The supply of electric current to the various parts of the apparatus may be controlled by the main switch 125 shown in Fig. 1, and a selector switch 126 is also shown which serves to select the particular kind of gas to be delivered to the tube A. That is, this selector will be turned toward one or the other of the indicators 127, depending upon whether the tube A is to be filled with gas from the supply container 32 or the supply container 33.

The apparatus may be placed into operation by means of a starter button 129, which actuates the solenoid 122 and starts the cycle of operations which result in the filling of the tube. Also, it is desirable to employ a signal or signals to inform the operator that the operation has been completed. For this purpose, I have shown a light 130 and a bell or buzzer 131, so that the operator may have both visual and oral indications that the operation is complete.

A photo-electric cell 133 is provided adjacent each of the electrodes of the tube A, as shown in the lower right-hand corner of Fig. 1 of the drawings, and lying adjacent the central portion of this tube is a thermostat 134. The photo cells operate to cut off the bombardment of the tube A when the electrodes of this tube have reached a cherry red color, while the thermostat, as will be hereinafter explained, is actuated when the temperature of the wall A reaches approximately 120° F. to increase the current strength in the bombarder circuit.

In the use of the device, each operation or each step in the process of evacuating and filling the tube is carried out by a device energized through the master control switch mechanism shown in Fig. 10. That is, when this switch is set at a certain position, it will energize the proper circuits to perform a certain operation or operations. At the conclusion thereof, the switch will be automatically moved to the next position to effect the next step in the process.

At certain stations or positions of the rotatable shaft 115, only one circuit will be closed, and, hence, only one of the arms 116 will be actively employed. However, at other stations, it is desired to close four circuits. Hence, four arms 116, together with four of the disks 113 carrying contacts 118, are provided.

When it is desired to fill a tube, such, for example, as a cold cathode tube, with rare gas, the main switch 125 is thrown to connect the device with a supply of electric current. This serves to start the evacuating pump (not shown), and also closes the vent valve 21 by means of the solenoid structure 21ᵃ which operates this valve, so that the line 18 is no longer vented to the atmosphere. Then, the operator pushes the starter button 129, which energizes the solenoid 122 and moves the ratchet wheel 119 one step, thus moving the shaft 115 of the master control switch to the first station, which closes the circuit at $a$ in Fig. 12. This serves to open valve 16 through the solenoid structure 16ᵃ, which operates this valve, thus opening tube 15 to the atmosphere. The operator can now connect the tube A, which is to be filled, with the delivery tube 14, and, during this operation, he blows through the tube 15 in order to make the connection.

After the tube A is properly connected, the starting button 129 is again depressed which moves the shaft 115 to the second station. At this station, as shown on the wiring diagram in Fig. 12, four circuits are closed, these being designated as $b$, $c$, $d$ and $e$ on Fig. 12.

The first of these circuits energizes one of the solenoids 16ᵃ to close the valve 16 and cut off the manifold from the atmosphere, while the second energizes the solenoid structure 19ᵃ to open valve 19 and connect the system, and, therefore, the tube A, to the evacuating pump through the tubes 14, 12, 17 and 18. The third of these contacts $d$ close a switch to introduce current in a circuit, which includes the wires 25 and 26 leading to the manometer 23 shown in Fig. 3. This is the bombarder circuit which is normally open in the manometer tube as shown, and also normally open at another point closed by the engagement at $d$. Thus the bombarder will be ready to begin operation when the lines 25 and 26 are connected by the mercury 24 or when the proper degree of vacuum exists in the tube A. The circuit closed at $e$ energizes the solenoid 135, shown at the right-hand side of Fig. 12, which serves to control the bombarding operation, as will be hereinafter explained.

The tube A is now being evacuated, and, as soon as the degree of vacuum therein raises the mercury in the manometer tube 23 to make contact across the wires 25 and 26, the bombardment will begin, this being effected through the transformer 136 and reactance 137, the latter controlling the current strength delivered to the electrodes of the tube A and being in turn controlled by the solenoid 138.

It will be seen that the reactance 137 has four positions, and is originally set, as shown in the drawings, to deliver current at substantially 500 milliamperes. This will continue until the wall of the tube reaches a temperature of approximately 120°, which will actuate the thermostat 134. The actuation of the thermostat serves to energize the solenoid 138, which moves the reactance control through one step to the second position which sets the bombarder circuit to deliver current at 700 milliamperes. The thermostat also actuates the solenoid 122, which moves the shaft 115 to the third position closing the circuit at $f$.

The closing of the circuit at this station serves to actuate the closing solenoid 19ª, so as to close valve 19 and cut off the system from the evacuating pump. The actuation of the closing solenoid serves to energize the solenoid 122, which moves the controlling switch to make contact at the point $g$. This serves to energize the solenoid 28ª, which operates to open and immediately close valve 28, allowing a charge of flushing gas to move into the tube 27 above the valve 29. The actuation of the solenoid 28ª also serves to actuate solenoid 122 to close the circuit at $h$, which actuates the solenoid 29ª to open and immediately close valve 29, thus allowing the charge of flushing gas to enter the tube A through the members 12 and 14.

Upon the closing of the valve 29, the solenoid 122 is actuated to move the master control switch to the next position, which closes the circuit at $i$, and this opens valve 19 through the controlling solenoid structure 19ª and again connects the system to the evacuating pump. At the same position, the switch also closes the circuits at $j$, $k$ and $l$. The circuit closed at $j$ serves to energize the bombarder circuit to begin bombardment at 700 milliamperes of current, or at the second setting of the reactance 137, which setting was effected by the thermostat 134, as previously explained, the bombarder circuit being closed at this time through the relay 140.

The tube A is, of course, now being evacuated, and, when the degree of vacuum reaches one-half millimeter absolute pressure, contact is made by the mercury in the manometer 23 across the wires 25 and 26, and the manometer circuit has been activated by the closing of the circuit at $k$, while the closing of the circuit at $l$ activates or admits current to the photo cells 133. When contact is made across the wires 25 and 26, the solenoid 141 is energized to set the timer 70. As the hand of the timer is being set, it passes contact 143, and thus momentarily actuates the solenoid 138 to shift the reactance 137 to its third position and start bombardment of the tube at one ampere.

The bombardment at one ampere continues during the operation of the timer 70, which is approximately thirty seconds, but may, of course, be more or less as desired, and, when the hand of the timer moves back past the contact 143, it again energizes the solenoid 138 to begin bombardment of the tube A at one and one-quarter amperes.

The bombardment of the tube at this current strength continues until the electrodes reach a cherry red color. The photo cells 133 react to this color and are energized to move the master control switch to station $m$, which stops the bombardment and sets in operation the lag device, shown in Fig. 2 of the drawings.

The operation of this lag device consumes a short period before the contacts 80 and 81 are closed. This period of time, during which the valve 19 is open and the pump is in operation, gives the evacuating pump an opportunity to draw off the impurities resulting from the bombardment after the latter has been stopped.

When the contacts 80 and 81 are closed, the solenoid 122 is again energized and the master control switch moved to station $n$. This serves to close valve 19, thus cutting off the pump from the tube A. When this valve closes, the solenoid 122 is again energized to move the master control switch to close the circuit at station $o$, which, under the setting of the switch 126, serves to open and immediately close valve 35 to flush the tube A with the same gas with which the tube is eventually to be filled.

With the closing of valve 35, the master control switch is moved to station $r$, which serves to open valve 19 and connect tube A with the evacuating pump to exhaust the flush gas from the tube. The opening of this valve then energizes the solenoid 122 to move the master control switch to station $s$, which serves to energize the solenoid 145 of the timing device 71.

This timing device will run for approximately three minutes, during which time the valve 19 will be open and the tube A connected with the evacuating pump. During this period, the tube A will cool considerably as it should before the rare gas is introduced therein. Usually it is desired that the tube cool to approximately 150° F., and the timer can, of course, be adjusted to secure this approximate result.

At the end of the operation of the timer, it again actuates the solenoid 122, which moves the master switch to position $t$ to close valve 19 and cut off the tube A from the evacuating pump. The operation of the closing solenoid 19ª, when it has closed the valve 19, again actuates solenoid 122 to move the master control switch to the next position where it closes the circuits at three points $u$, $v$ and $w$.

The closing of the circuit at $u$ energizes the solenoid 68 of the injector device, shown in Fig. 5 of the drawings, so as to throw a charge of mercury into the tube A. It will be, of course, understood that, if the switch hand 126 is set to the left or opposite the contact 127, the mercury injector will not operate at this time.

The closing of the circuit at $w$ serves to energize the solenoid 49 (Fig. 4) and move the needle valve 45 to the left, thus exposing the right-hand leg of the manometer 41 to the pressure existing within the tube A, and, at the same time, current is introduced into the light source 52 or 53, while the closing of the circuit at $v$ opens valve 35 to permit the charge of rare gas to be introduced into the tube A. It will, of course, be understood that, if the switch hand 126 is properly set, this would serve to open valve 34 at this time to introduce another kind of gas into the tube.

The tube A is now being filled with rare gas under pressure of a few millimeters. This gas also moves into the right-hand branch of the manometer tube, shown in Fig. 4, and forces the liquid in the left-hand branch of this tube upwardly so as to cut off the light from the source 52 or 53, which will cause either the photo cell 54 or 55 to operate, thus bringing the switch 148 into the position shown on Fig. 12, thus closing valve 35 (or 34, depending upon which has been used) to cut off communication between the tube A and the supply of rare gas.

The actuation of this valve 35 serves to energize the solenoid 122, moving the master control switch to the last position to close the circuit at $x$. This lights the lamp 130 and rings and sounds the buzzer 131 to give the operator both a visual and oral indication that the process has been completed and that it is time to remove the tube A from the circuit.

It will be apparent that, at this time, all of the valves are closed and all parts of the apparatus are in the positions occupied at the beginning of the operation.

It has been noted that valves 28 and 29, and also, in some instances, valves 34 and 35, are immediately closed after they are opened. This is accomplished by action of the laterally projecting fingers 107 and 108, and the action may be understood from the wiring diagram shown in Fig. 12. As shown in connection with the valve 28, for example, the finger 107 has engaged the center contact 107$^a$, and is holding it in engagement with the upper contact 107$^b$. It will be seen that, in this position, when the master switch has closed the circuit at the station $g$, current will pass through the contacts 107$^a$ and 107$^b$ to the opening solenoid 28$^a$. This serves to move the plunger 98 downwardly to open the valve 28, as has been previously explained. When the plunger 98 moves downwardly, the arm 108 strikes the contact 107$^a$ and moves it downwardly to close a circuit with the contact 107$^c$. This immediately energizes the right-hand solenoid 28$^b$, the plunger of which moves downwardly to again close the valve. Upon the downward movement of this latter plunger, contact is again made at the point 109$^a$ by the arm 110 which serves to energize the solenoid 122, which controls the master switch so as to move the latter to the next station.

The solenoid 135 controls the bombardment of the tube by means of a pair of movable contacts 150 and 151 secured to, but insulated from, an armature 152, which is attracted by the solenoid 135.

When the master switch closes the circuit at station $e$, the solenoid 135 is energized and attracts the armature 152, thus moving the contacts 150 and 151 to the left against contacts 153 and 154, respectively. This, as will be seen from the wiring diagram, causes the current flowing in the circuit closed by the manometer 23 to flow through contact 153 to the switch 155 of the thermostat 134 and then through contacts 154 and 151 to the solenoid 156, which serves to close the switch at 157 and energize the transformer 136 of the bombarder circuit.

Figure 12:
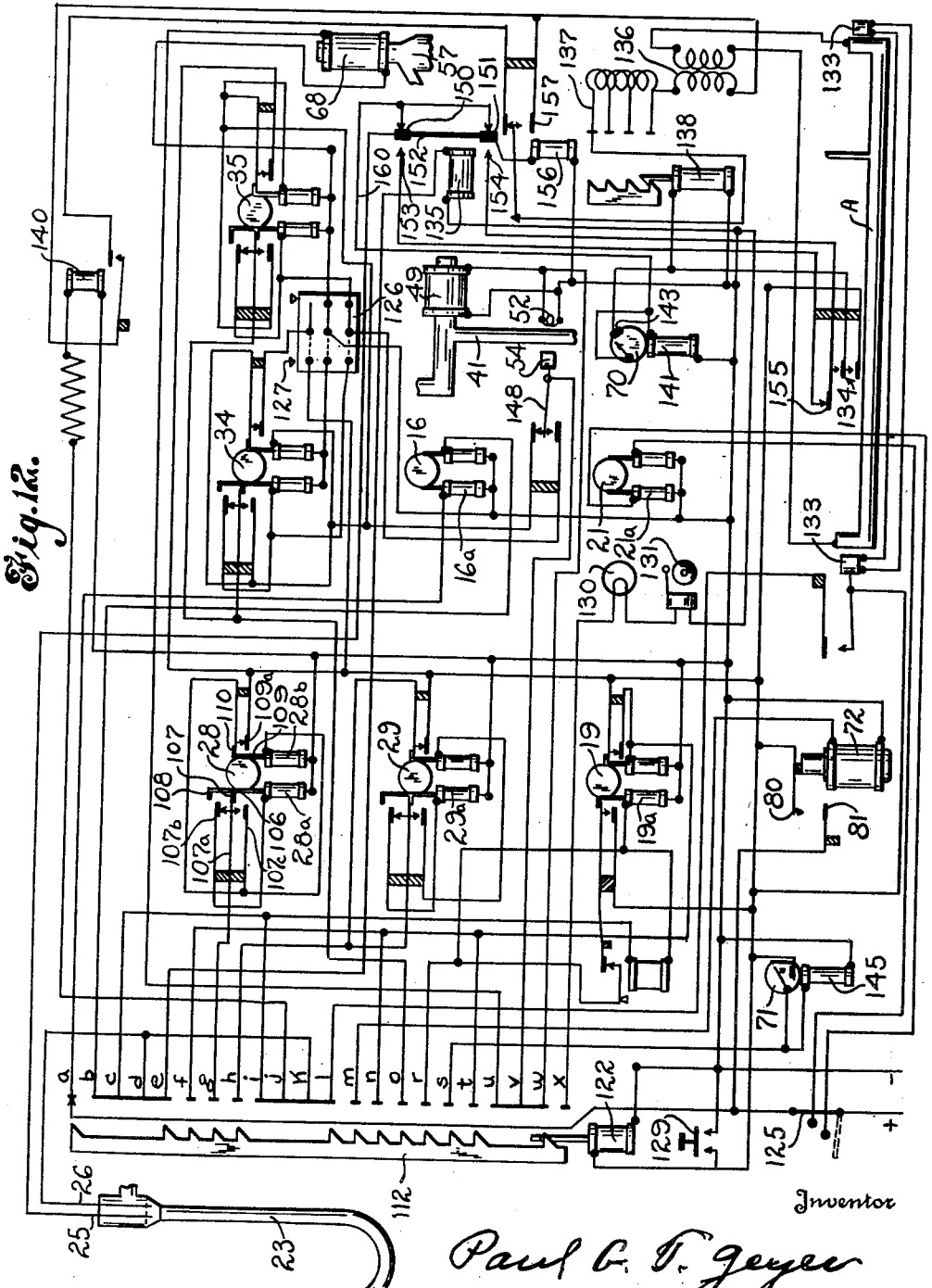
Fig. 12 is a diagrammatic view showing the wiring connections to the various parts of the apparatus.

When the contacts 150 and 151 are in the position shown in Fig. 12 of the drawings and current flows through the wires 25 and 26, due to the rise of the mercury in the manometer tube 23, current will pass into the line 160 to the timer 70 and also to the solenoid 156. This occurs when the master switch closes the contact at the point $k$.

It has been previously stated that the valves 36 and 37 are manually operated. If it should occur that impurities are present in the tubes 30 and 31 above the restrictions 38 and 39, these valves 36 and 37 can be opened when the valves 34 and 35 are closed and these impurities drawn off through the evacuating pump, thus by-passing the restrictions 38 and 39 and valves 34 and 35. It will be understood that, during the normal operation of the device, the valves 36 and 37 will remain closed.

In filling a neon tube with rare gas, the tube to be filled would be connected to the apparatus in the same manner as described above, that is, connected either with the tube 13 or the tube 14, depending upon whether it was desired to use mercury. The pushbutton would then be pressed to connect the system to the evacuating pump, and the tube evacuated. When the degree of vacuum reached a predetermined amount, the bombardment would be started and would be continued at a constant current strength, although this current strength might be varied for any one particular tube. The bombarding operation would be stopped by means of the color of the electrodes in the same manner as has been described with the cold cathode tube, and the timing apparatus would be activated to give the tube time to cool before the next operation.

No flushing of the tube is necessary in this case, and as soon as the tube has cooled sufficiently, it is connected to the gas supply and the tube filled with gas under a pressure of a few millimeters of mercury. When the pressure in the tube reaches a predetermined amount, as determined by the manometer shown in Fig. 4, the supply container will be cut off and the operation will be finished and the tube may be disconnected from the apparatus.

While I have shown and described a preferred embodiment of my invention and a preferred method of carrying out my process, it will be understood that it is not to be limited to all of the details shown nor to the exact steps described, but is capable of modification and variation within the spirit of the invention and within the scope of the claims.

What I claim is:

1. An apparatus for filling with gas a tube having electrodes therein, said apparatus comprising evacuating means, bombarding means, including a normally open electric circuit and means to automatically close said circuit and set said bombarding means into operation when a predetermined pressure is present in the tube.

2. An apparatus for filling with gas a tube having electrodes therein, said apparatus comprising evacuating means, bombarding means, including a normally open electric circuit and pressure-actuated means to close said circuit and set said bombarding means into operation, said pressure-actuated means being controlled by pressure existing in the tube.

3. An apparatus for filling with gas a tube having electrodes therein, said apparatus comprising evacuating means, bombarding means, pressure-actuated means to set said bombarding means into operation, said pressure-actuated means being controlled by pressure existing in the tube, and thermostat means to interrupt the bombarding action when the temperature of the tube is raised to a predetermined point.

4. An apparatus for filling with gas a tube having electrodes therein, said apparatus comprising evacuating means, bombarding means, pressure-actuated means to set said bombarding means into operation, said pressure-actuated means being controlled by pressure existing in the tube, means, including a thermostat for interrupting said bombardment, and means actuated by said thermostat for introducing a flushing gas into the tube when the latter has reached a predetermined temperature.

5. An apparatus for filling with gas a tube having electrodes therein, said apparatus comprising evacuating means, bombarding means including a normally open electric circuit, pressure-actuated means to close said circuit and set said bombarding means into operation, said pressure-actuated means being controlled by pressure existing in the tube, temperature-responsive means for interrupting said bombardment and flushing out the tube with gas, and means automatically actuated at the conclusion of the flushing operation for thereafter bombarding the tube under a current of greater strength than that of the original bombardment.

6. An apparatus for filling with gas a tube having electrodes therein, said apparatus comprising evacuating means, bombarding means, pressure-actuated means to set said bombarding means into operation, said pressure-actuated means being controlled by pressure existing in the tube, means for interrupting said bombardment and flushing out the tube with gas, means for thereafter bombarding the tube under a current of greater strength than that of the original bombardment, pressure-actuated means responsive to pressure within the tube to further increase the strength of the bombarding current, a timer, and means controlled by said timer to limit the bombardment by current of said increased strength.

7. An apparatus for filling with gas a tube having electrodes therein, said apparatus comprising evacuating means, bombarding means, pressure-actuated means to set said bombarding means into operation, said pressure-actuated means being controlled by pressure existing in the tube, and electrically controlled means to effect the bombarding action under current strength of successively increased amounts.

8. An apparatus for filling with gas a tube having electrodes therein, said apparatus comprising evacuating means, bombarding means including a normally open electric circuit, pressure-actuated means to close said circuit and set said bombarding means into operation, said pressure-actuated means being controlled by pressure existing in the tube, and means controlled by the temperature of the tube electrodes for discontinuing the bombarding operation.

9. An apparatus for filling with gas a tube having electrodes therein, said apparatus comprising evacuating means, bombarding means including a normally open electric circuit, pressure-actuated means to close said circuit and set said bombarding means into operation, said pressure-actuated means being controlled by pressure existing in the tube, means to effect the bombarding action under current strength of successively increased amounts, and means controlled by the temperature of the tube electrodes for discontinuing the bombarding operation.

10. An apparatus for filling with gas a tube having electrodes therein, said apparatus comprising evacuating means, bombarding means, pressure-actuated means to set said bombarding means into operation, said pressure-actuated means being controlled by pressure existing in the tube, means controlled by the temperature of the tube electrodes for discontinuing the bombarding operation, valve means for thereafter placing said tube in communication with an evacuating pump, and an electrically controlled timing device for closing said valve means and shutting off said communication to discontinue the evacuating of the tube.

11. An apparatus for filling with gas a tube having electrodes therein, said apparatus comprising evacuating means, bombarding means, pressure-actuated means to set said bombarding means into operation, said pressure-actuated means being exposed to and controlled by pressure existing in the tube, means controlled by the temperature of the tube electrodes for discontinuing the bombarding operation, means for evacuating the tube after the discontinuance of the bombarding operation, including a pump and a valve controlling communication between the tube and pump, timed means for actuating said valve, and means for thereafter introducing the filling gas into the tube.

12. An apparatus for filling with gas a tube having electrodes therein, said apparatus comprising evacuating means, bombarding means including a normally open electric circuit, pressure-actuated means to close said circuit and set said bombarding means into operation, said pressure-actuated means being exposed to and controlled by pressure existing in the tube, means controlled by the temperature of the tube electrodes for discontinuing the bombarding operation, means for evacuating the tube after the discontinuance of the bombarding operation, means for thereafter connecting the tube to a supply of filling gas, and means controlled by gas pressure in the tube for closing said connection.

13. An apparatus for filling with gas a tube having electrodes therein, said apparatus comprising evacuating means, bombarding means, pressure-actuated means to set said bombarding means into operation, said pressure-actuated means being exposed to and controlled by pressure existing in the tube, means controlled by the temperature of the tube electrodes for discontinuing the bombarding operation, means for evacuating the tube after the discontinuance of the bombarding operation, means for thereafter connecting the tube to a supply of filling gas, and means controlled by gas pressure in the tube for closing said connection, said last-named means comprising a manometer in communication with the tube.

14. An apparatus for filling with gas a tube having electrodes therein, said apparatus comprising evacuating means, bombarding means, pressure-actuated means to set said bombarding means into operation, said pressure-actuated means being controlled by pressure existing in the tube, means controlled by the temperature of the tube electrodes for discontinuing the bombarding operation, means for evacuating the tube after the discontinuance of the bombarding operation, means for thereafter connecting the tube to a supply of filling gas, means controlled by gas pressure in the tube for closing said connection, said last-named means comprising a manometer in communication with the tube, and a light-sensitive electric cell operated by the movement of a column of liquid in the manometer.

15. An apparatus for filling a lighting tube with gas, the tube being provided with electrodes, said apparatus comprising a tubular conduit to which the tube to be filled is connected, an evacuating pump, a supply container for the gas, valve means for placing said conduit into communication with the pump and the supply container and for cutting off said communication, electrically operated solenoids for actuating said valve means, a master switch for operating said solenoids, said switch having a plurality of positions, and means whereby the operation of one of said solenoids moves said switch to another position.

16. An apparatus for filling a lighting tube with gas, the tube being provided with electrodes, said apparatus comprising a tubular conduit to which the tube to be filled is connected, an evacuating pump, a supply container for the gas, valve means for placing said conduit into communication with the pump and the supply container and for cutting off said communication, electrical means for actuating said valve means, a bombarder circuit designed to be connected to the electrodes, a switch for closing said bombarder circuit, and a manometer for operating said switch.

17. An apparatus for filling a lighting tube with gas, the tube being provided with electrodes, said apparatus comprising a tubular conduit to which the tube to be filled is connected, an evacuating pump, a supply container for the gas, valve means for placing said conduit into communication with the pump and the supply container and for cutting off said communication, electrical means for actuating said valve means, a bombarder circuit designed to be connected to the electrodes, electrical means for energizing said bombarder circuit, and a manometer exposed to pressure existing in the tube for controlling said electrical means.

18. An apparatus for filling a lighting tube with gas, the tube being provided with electrodes, said apparatus comprising a tubular conduit to which the tube to be filled is connected, an evacuating pump, a supply container for the gas, valve means for placing said conduit into communication with the pump and the supply container and for cutting off said communication, electrical means for actuating said valve means, a master switch, said switch having one position to energize the electrical means for actuating the valve means connecting the conduit with the pump, and another position for energizing the electrical means for actuating the valve means which places the conduit in communication with the supply container, and means actuated by each of said valve means for moving said switch to another position.

19. An apparatus for filling a lighting tube with gas, the tube being provided with electrodes, said apparatus comprising a tubular conduit to which the tube to be filled is connected, an evacuating pump, a supply container for the gas, valve means for placing said conduit into communication with the pump and the supply container and for cutting off said communication, electrical means for actuating said valve means, a master switch, said switch having one position to energize the electrical means for actuating the valve means connecting the conduit with the pump, another position for energizing the electrical means for actuating the valve means which places the conduit in communication with the supply container, and means whereby actuation of one of said valve means moves said switch to another position.

20. The method of filling a lighting tube having electrodes with a gas, which comprises connecting said tube with an evacuating pump and connecting the electrodes to an electrical circuit, and then energizing said electrical circuit to begin bombardment of the tube by means of reduction of pressure within the tube.

21. The method of filling a lighting tube having electrodes with a gas, which comprises connecting said tube with an evacuating pump and connecting the electrodes to an electrical circuit, then energizing said electrical circuit to begin bombardment of the tube by means of reduction of pressure within the tube, and thereafter discontinuing the bombarding of the tube by opening the bombarder circuit by means of a photosensitive electric cell activated by the color of the tube electrodes.

22. Means for controlling the filling of a lighting tube with gas from a container comprising a conduit extending from the container to the tube to be filled, a U-shaped manometer tube having both legs thereof in communication with said conduit so as to be subjected to the pressure within the tube, a valve adapted to control the communication between one leg of the manometer and said conduit, and electrical means for operating said valve.

23. A liquid injector mechanism for injecting a liquid into a lighting tube, said mechanism including a container, said container being provided with an outlet above the normal level of the liquid therein, a hollow plunger movably mounted within the container and having an opening adjacent its lower end, a fixed ram member extending into the plunger, and electrical means for moving said plunger toward the ram member to discharge liquid in the plunger through said opening.

PAUL G. T. GEYER.

REFERENCES CITED

The following references are of record in the file of this patent:

UNITED STATES PATENTS

| Number | Name | Date |
| --- | --- | --- |
| 2,242,465 | Green et al. | May 20, 1941 |
| 2,247,513 | Marshaus | July 1, 1941 |
| 2,249,098 | Van Sant | July 15, 1941 |
| 2,259,105 | Freeman | Oct. 14, 1941 |
| 2,324,559 | Cooke | July 20, 1943 |
| 2,358,566 | Eitel et al. | Sept. 19, 1944 |